Nov. 27, 1923.
M. A. BARBER
REMOVABLE NIPPLE AND GASKET
Filed Sept. 30, 1920
1,475,530
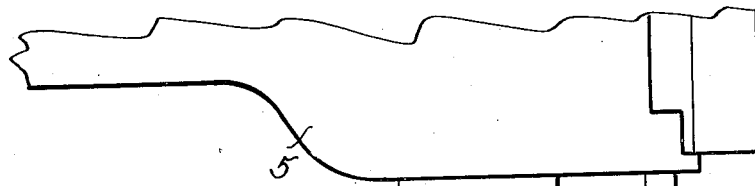
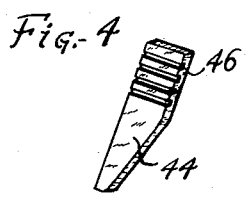
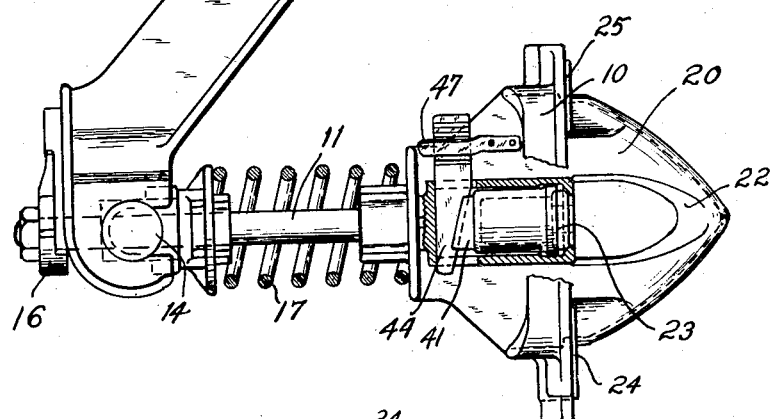
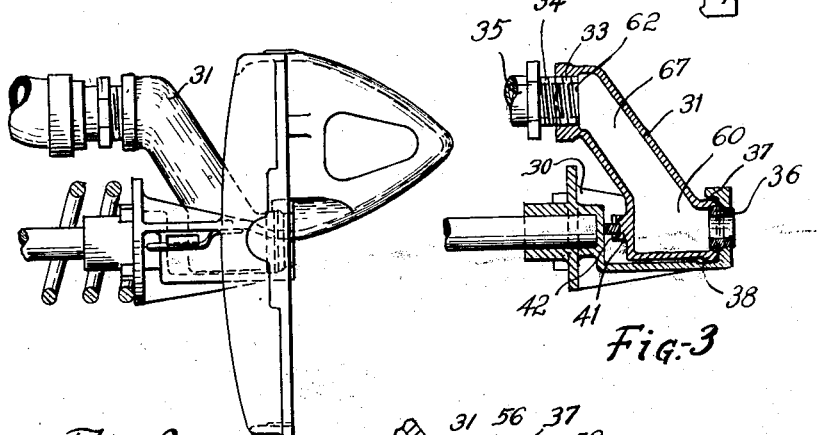
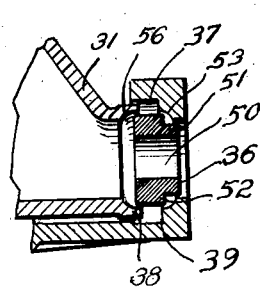
Inventor
Martin A. Barber
By Davis & Macklin
Attorneys Patented Nov. 27, 1923.

1,475,530

UNITED STATES PATENT OFFICE.

MARTIN A. BARBER, OF CLEVELAND, OHIO, ASSIGNOR, BY MESNE ASSIGNMENTS, TO THE AMERICAN AUTOMATIC CONNECTOR COMPANY, OF WYOMING, DELAWARE, A CORPORATION OF DELAWARE.

REMOVABLE NIPPLE AND GASKET.

Application filed September 30, 1920. Serial No. 413,879.

*To all whom it may concern:*

Be it known that I, MARTIN A. BARBER, a citizen of the United States, residing at Cleveland, in the county of Cuyahoga and State of Ohio, have invented a certain new and useful Improvement in Removable Nipples and Gaskets, of which the following is a full, clear, and exact description, reference being had to the accompanying drawings.

This invention relates to automatic train pipe coupling heads and in particular to a coupling head, wherein a removable nipple and gasket are used.

An object of my invention is to provide a coupler head having an improved nipple and gasket construction so arranged that it may be removed and replaced while the heads remain coupled.

A further object is the provision of means for securing the nipple and gasket firmly in position in the head, constructed so that they may be easily and quickly removed without necessitating the uncoupling of the heads.

An additional object is to provide a novel type of nipple.

My invention is hereinafter more fully explained in connection with the accompanying drawings, and its essential characteristics are summarized in the claims.

In the drawings which illustrate a preferred embodiment of my invention, Fig. 1 is a side elevation of an automatic connector, showing the removable nipple and gasket in one of the coupling heads; Fig. 2 is a top view of my improved coupling head; Fig. 3 is a central longitudinal section therethru; and Fig. 4 is a perspective view of a locking wedge for removably securing the nipple in place. Fig. 5 is a fragmentary section showing the gasket.

In the following specification my removable nipple and gasket is shown in use with an automatic train pipe connector, having a spring pressed coupling head. This head is shown as supported on the coupler and as provided on one side with a projection and on the other side with a recess. A connector of this type is shown for example in the patent granted to A. L. Moler and his assignees, November 23, 1915, and numbered 1,161,403. The present invention, however, is applicable to connectors of other types and is not limited to use with the particular coupler head shown.

Referring to the drawings, I have shown at 5 the usual coupler from which depends a bracket 7 shown as held to the coupler by fastening members 8. The coupler comprises a head 10, having a shank 11 thereon, the latter being universally mounted at 14 upon the bracket 7. The shank 11 extends thru the bracket 12 and has upon its rear end a stop member 16. A spring 17 surrounding the shank 11 urges the head forward and causes the stop member to bear against the rear end of the bracket 7 and thus support the connector.

The head 10 of the coupler is provided with a projection 20, the projection being recessed at 22 in line with a train pipe orifice 23. Other train pipe orifices are shown at 24 and 25, for which suitable gaskets are provided adjacent the ends of the orifices.

The connector head is recessed to provide a chamber in the rear of the coupling face as shown at 30. A nipple 31 is adapted to be secured in the chamber 30, as shown particularly in Fig. 3. This nipple is shown as threaded at 33 to receive a coupling 34 for connection with the train pipe 35. The other end of the nipple is constructed to receive a gasket 36, which extends thru the head as shown. The portion of the head about the orifice is shown as recessed at 37 to receive the nipple.

The gasket 36, as shown, comprises an annular portion having a central aperture 50, and having a reduced portion 51 adjacent one end thereby forming a shoulder 52, which is adapted to abut against a curved portion 53 of the coupler head as shown. The portion of the nipple 31, which engages the gasket, is shown as rounded at 56 to make a tight fit with the gasket. As shown in Fig. 3, when the nipple is in fitted position the gasket is pressed into tight engagement with the curved portions 53 and 56 thereby assuring a tight joint.

It will be noted that the nipple comprises a front portion 60 which is indicated as concentric with the axis of the connector shank 11, a portion 61 arranged oblique to the portion 60; and a third portion 62 which is shown as having its axis parallel to that of the portion 60. This type of nipple, I have found quite desirable as it is quite efficient although not expensive to manufacture.

The nipple 31 is provided, as shown, with a lug 38, which, in the fitted position, is disposed in the recess 39 formed in the coupler head.

In order to removably secure the nipple 31 in place, the latter is provided with a shoulder 41 adjacent its rear portion. This shoulder is slotted, as shown at 42, to provide spaced lugs which receive a tapered key 44, which is adapted to be forced into place and thereby cause the gasket to make a tight joint, the upper end of the key 44 is provided with slots 46 to co-operate with a leaf spring fastener 47, carried by the coupler head.

After a train is made up if frequently happens that a leak, due to a faulty gasket, is found in the air brake line. When this occurs it is necessary to replace the gasket and, according to my invention, this can be readily done. The pin 44 is first removed, the spring 47 being manually moved aside. This being done, the nipple 31 is removed from the opening 30, a fresh gasket is inserted, and the nipple is then replaced in position and the key driven home.

It will thus be seen that I have provided a simple and efficient means, whereby the gasket of an automatic train pipe connector may be very easily replaced without uncoupling the cars.

Having thus described my invention, I claim:—

1. In an automatic connector, the combination of a head having an orifice, a shank behind the orifice and aligned with it for supporting said head, there being a cavity in the rear portion of the head between its face and the shank, said cavity opening toward the side, a removable nipple seated in said cavity and extending out through said side opening, a gasket located partially within the cavity in front of the nipple, and means for holding the nipple in various adjusted positions within the cavity to maintain the gasket properly compressed.

2. An automatic train pipe connector having a chambered head, the face of the connector head having an opening therein communicating with said chamber, a removable nipple in said chamber, said nipple having a pair of spaced lugs thereon and a tapering key adapted to be interposed between the said lugs and operating to secure said nipple in place.

3. An automatic train pipe connector having a chambered head, an opening in the face of the connector communicating with such chamber, a removable nipple in said chamber, said nipple having key engaging means thereon, a compressible gasket located between the head and nipple, a tapered key adapted to co-operate with said means to cause the nipple to variably compress the gasket, and means for holding the key in different active positions.

4. An automatic train pipe connector, comprising a coupler head, and a port, and having a chamber in the rear of said port, a removable nipple engaged in said port, one part of said nipple being axial with the coupler head, another part extending laterally thereof and a third part parallel with and offset from said axial portion, and a pair of spaced lugs on said nipple adapted to receive a key to secure said nipple in place.

5. A removable nipple comprising a front portion adapted to receive a gasket, a portion extending obliquely from said front portion and communicating with a third portion, the latter portion having its axis parallel with that of the first portion, and a pair of spaced ribs on said nipple.

6. An automatic connector comprising one portion having an aperture therein, and a cupped seat adjacent said aperture, a second member having a cupped seat substantially opposite the first mentioned cupped seat, and a gasket having one portion which fits said aperture, and a second portion of larger diameter adapted to be embraced by said cupped portions.

In testimony whereof, I hereunto affix my signature.

MARTIN A. BARBER.